(12) United States Patent
Kumar et al.

(10) Patent No.: US 12,255,899 B2
(45) Date of Patent: *Mar. 18, 2025

(54) PRIVILEGED ACCESS REQUEST SYSTEM

(71) Applicant: RAKUTEN SYMPHONY, INC., Tokyo (JP)

(72) Inventors: Rajneesh Kumar, Tokyo (JP); Remi Ferreres, Singapore (SG)

(73) Assignee: RAKUTEN SYMPHONY, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/768,471

(22) PCT Filed: Mar. 17, 2022

(86) PCT No.: PCT/US2022/020711
§ 371 (c)(1),
(2) Date: Apr. 13, 2022

(87) PCT Pub. No.: WO2023/177399
PCT Pub. Date: Sep. 21, 2023

(65) Prior Publication Data
US 2024/0297886 A1 Sep. 5, 2024

(51) Int. Cl.
*H04L 9/40* (2022.01)

(52) U.S. Cl.
CPC .......... *H04L 63/105* (2013.01); *H04L 63/108* (2013.01)

(58) Field of Classification Search
CPC ..... H04L 63/10; H04L 63/105; H04L 63/107; H04L 63/108
See application file for complete search history.

(56) References Cited

U.S. PATENT DOCUMENTS

| | | | |
|---|---|---|---|
| 2006/0078606 A1 | 4/2006 | Kim et al. | |
| 2013/0227676 A1* | 8/2013 | Guo | G06F 21/31 726/17 |
| 2016/0000705 A1 | 1/2016 | McDonald et al. | |
| 2018/0351961 A1* | 12/2018 | Calcaterra | H04L 63/105 |
| 2019/0251281 A1* | 8/2019 | Freedman | G06F 21/62 |
| 2020/0042723 A1* | 2/2020 | Krishnamoorthy | G06F 21/45 |
| 2020/0128018 A1* | 4/2020 | Kumaraswamy | H04L 63/108 |
| 2023/0244775 A1* | 8/2023 | Alexander | G06F 21/316 726/18 |
| 2024/0137368 A1* | 4/2024 | Kumar | H04L 63/105 |

* cited by examiner

*Primary Examiner* — Boris D Grijalva Lobos
(74) *Attorney, Agent, or Firm* — HAUPTMAN HAM, LLP

(57) ABSTRACT

Privileged access is managed by receiving a request for privileged access to a device connected to a network, determining a risk level associated with the request based on a duration of the privileged access, a device identifier, a first user identifier, and a requested privilege level included in the request, identifying a second user to control authorization of the device based on the risk level, and scheduling, in response to receiving authorization from the second user, a process to modify an entry in a permissions database to associate the first user identifier and the device identifier with the requested privilege level for the duration.

20 Claims, 9 Drawing Sheets

PRIVILEGED ACCESS REQUEST FORM — 330

| USERS | DEVICES |
|---|---|
| User A9<br>User 42　332<br>Group 7 | Router 24<br>Switch 1A5　334 |

336

PRIVILEGE LEVEL | Edit access |

START | 5/11 09:30 |    END | 5/11 15:00 |
338                                      339

SUBMIT  
348

FIG. 3

```
<USER-PRIVILEGES>
   <USER-ID>User A9
      <DEFAULT-PRIVILEGE>Read-Only
      <EDIT-PRIVILEGE>Router 43, Switch 26A
      <ADMIN-PRIVILEGE>None
      <AUTHORITY>None

```
<DEVICE-PRIVILEGES>
   <DEVICE-ID>Router 24
      <EDIT-PRIVILEGE>Group 5
      <ADMIN-PRIVILEGE>User 7A
      <AUTHORITY>User E2

PRIVILEGED ACCESS REQUEST SYSTEM

RELATED APPLICATIONS

The present application is a National Phase of International Application No. PCT/US2022/020711, filed Mar. 17, 2022.

BACKGROUND

During constructing, developing, and maintaining a network system, users request privileged access for some specific network resource(s) and/or network device(s) for a certain period. Privileged access is the authority a user has in, for example, overriding, bypassing, accessing, or configuring certain security restraints. One example privileged access is permission to perform an action such as shutting down a service, loading new device drivers, configuring network services, etc. Privileged access is managed through a process of assigning, retracting, or configuring privileged access of users to perform certain actions involving certain resources and/or devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a graphical user interface of a form for privileged access requesting, according to at least some embodiments of the present invention.

FIG. 5 is a portion of a permissions database, according to at least some embodiments of the present invention.

FIG. 6 is a portion of an inventory database, according to at least some embodiments of the present invention.

DETAILED DESCRIPTION

Figure 1:
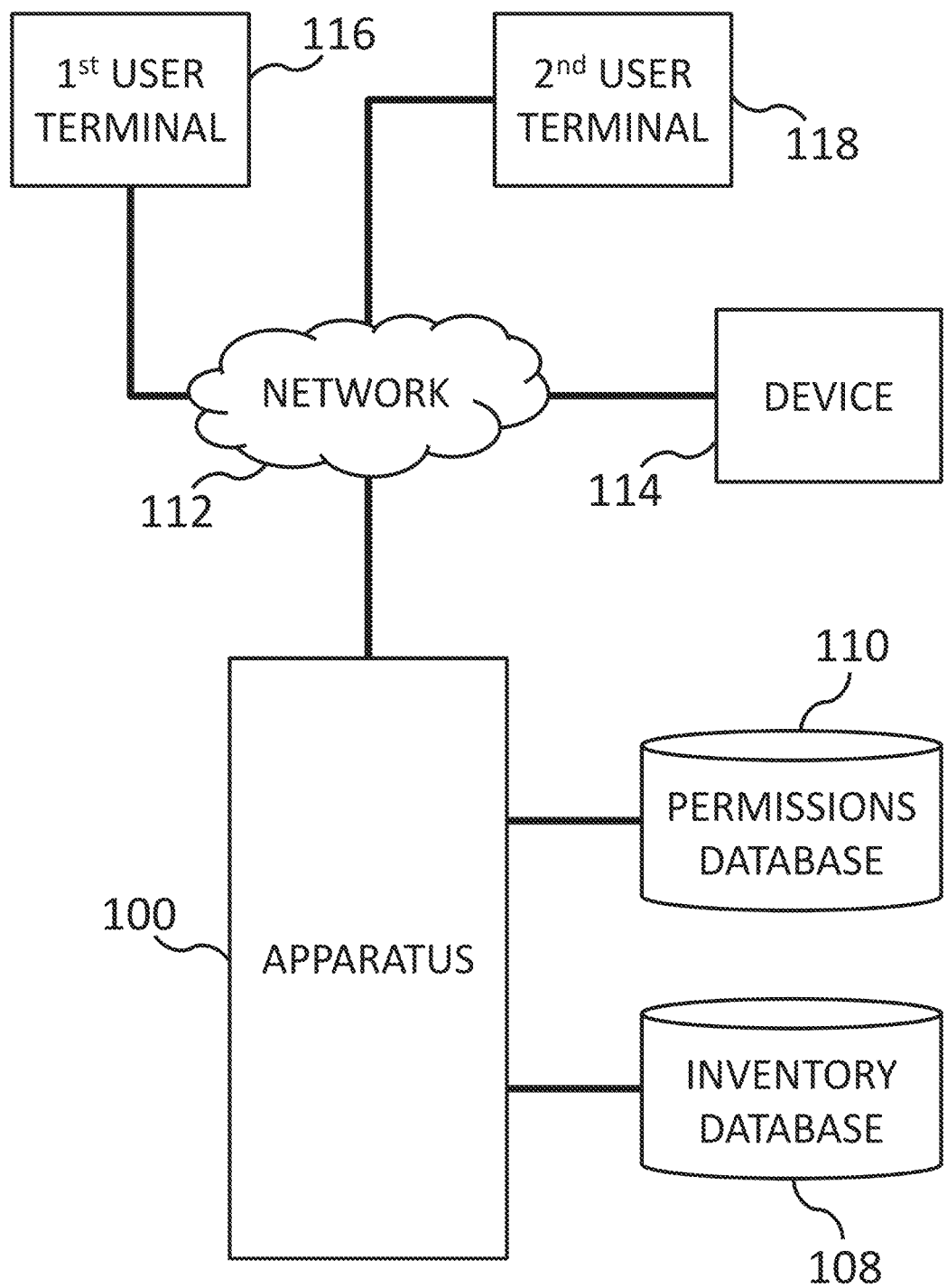
FIG. 1 is a schematic diagram of a privileged access request system, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

A simplified approach to privileged access management would be to allow users to request and subsequently grant privileged access of a fixed set of permissions for 24 hours. However, different users have different purposes and requirements for requesting privileged access. A fixed set of permissions will be more than required for some purposes and insufficient for other purposes. Likewise, the fixed duration of 24 hours for the privileged access will be more than required for some purposes, potentially exposing the system to security threats, and insufficient for other purposes, burdening users to renew or re-apply for the same privileged access. As the number of users involved in a network and the number of services and devices accessible by users increases, the safety and efficiency of such simplified approaches decreases.

Furthermore, services and devices provided by different vendors or contractors having different permissions included in the respective fixed set of permissions is likely to be burdensome and confusing for users requesting privileged access from such different vendors or contractors.

At least some embodiments herein provide a privileged access management system, which enables multiple users to request privileged access with a set of permissions based on a specific purpose. At least some embodiments herein enable users to request privileged access by themselves, as well as on behalf of other users.

In at least some embodiments, a privileged access management system enables users to request privileged access to network devices via an Application Programming Interface (API). In at least some embodiments, the system controls the granularity of privileged access, such as read-only access, read-write access, and the like, instead of a uniform set of permissions. In at least some embodiments, the system managing the privileged access granted to users via the centralized API to reduce the risk of network intrusion in an environment with a plethora of devices.

An example of such an environment is a radio access network using Open Radio Access Network (RAN). Open RAN enables interoperability of equipment between vendors, flexibility in where the data received from the radio network is processed, and processing of information to be distributed away from the base stations. An Open RAN includes multiple devices, such as routers and other hardware, distributed over a wide area, and which are made and supported by different vendors.

In at least some embodiments, the system grants time limited access for a customizable amount of time to the device on the network. In at least some embodiments, the system schedules access to the network device at a later time and for the customizable limited time period.

FIG. 1 is a diagram of a privileged access request system, according to at least some embodiments of the present invention. In at least some embodiments, the system includes a cloud architecture. In at least some embodiments, the system hosts a cluster of servers. In at least some embodiments, the system hosts a public cloud, a private cloud, and/or a hybrid cloud. The diagram includes an apparatus 100, an inventory database 108, a permissions database 110, a network 112, a device 114, a first user terminal 116 and a second user terminal 118.

Network 112 is configured to enable communication among at least apparatus 100, device 114, first user terminal 116, and second user terminal 118. In at least some embodiments, network 112 is a RAN. In at least some embodiments, network 112 is configured to operate under network compliances to 4G standards, 5G standards, or any other wide area radio access network protocol. In at least some embodiments, the system is an Open RAN environment.

In at least some embodiments, the system is disaggregated into three main building blocks, Radio Units (RU), Distributed Units (DU), and Central Units (CU). In at least some embodiments, an RU receives, transmits, amplifies, and digitizes radio frequency signals. In at least some embodiments, the RU is located near, or integrated into the antenna. In at least some embodiments, a DU and a CU form a computational component of a base station, sending the digitalized radio signal into the network. In at least some embodiments, the DU is physically located at or near the RU. In at least some embodiments, the CU is physically distant from the DU and RU and is located nearer the core. In at least some embodiments, device 114 is one of an RU, a DU, or a CU.

In at least some embodiments, the system architecture 100 implements the Open RAN based on protocols and interfaces between these various building blocks (radios, hardware, and software) in the RAN. Examples of Open RAN interfaces include a front-haul between the Radio Unit and the Distributed Unit, a mid-haul between the Distributed Unit and the Centralized Unit and a back-haul connecting the RAN to the core. In at least some embodiments, the DU and/or the CU are virtualized and run in a server or a cluster of servers. In at least some embodiments, network 112 includes front-hauls, mid-hauls, and back-hauls.

Apparatus 100 is in communication with inventory database 108 and permissions database 110. In at least some embodiments, apparatus 100 is configured to perform privileged access management. In at least some embodiments, the inventory database 108 stores a list of devices connected to network 112. In at least some embodiments, the inventory database 108 hosts a list of devices in an Open RAN network, such as RU devices, DU devices, CU devices, and the like. In at least some embodiments, inventory database 108 contains information about devices from different users, including information about the program defaults, administration information of the devices, and/or any suitable information of the devices.

In at least some embodiments, permissions database 110 stores information about users and groups that are assigned to users. In at least some embodiments, a group defines a default privilege level available to assigned users of devices in the network. In at least some embodiments, permissions database 110 is a directory service that controls a modes system for controlling object access in operating systems. In at least some embodiments, apparatus 100 is configured to periodically query inventory database 108 and permissions database 110 for information about the devices on the network, the users, and their assigned groups, and to store the information using internal storage or external storage. In at least some embodiments, apparatus 100 is configured to query inventory database 108 and permissions database 110 for information about the devices on the network, the users, and their assigned groups in response to requests from user terminals, devices, etc.

In at least some embodiments, apparatus 100 is configured to, based on a determination that the user of user terminal 116 is not authorized to access the requested device and/or service, identify a system administrator or other user with sufficient privilege level to authorize the access request. In one or more examples, the system administrator has privileged access to the network devices and services, and has permission to authorize other users to access the devices and services. In at least some embodiments, apparatus 100 is configured to receive authorization from the system administrator, and to schedule a modification of the information in permissions database 110 so that the user of first user terminal 116 is able to access to the device. In at least some embodiments, apparatus 100 is configured to schedule another modification to permission database 110 to retract the access to the device and/or service at expiration of the time-limit for which the authorization was approved.

In at least some embodiments, apparatus 100 is configured to receive a request from first user terminal 116 requesting access to a device and/or service. In at least some embodiments, apparatus 100 is configured to associate the request with the user of first user terminal 116 using a request identification (ID). In at least some embodiments, apparatus 100 is configured to maintain a list of requests associated with the users included in the request, the purpose or the task included in the request, the status of the request, or the like. In at least some embodiments, apparatus 100 is configured to present a graphical user interface to enable the user to cancel a request, modify a request, or the like. In at least some embodiments, apparatus 100 is configured to provide information of the workflow associated with a request.

In at least some embodiments, users included in an authorized privilege access request are enabled to access the requested device and/or service. At least one of apparatus 100, device 114, and/or service provider is configured to authenticate first user terminal 116 based on information from permissions database 110. In at least some embodiments, apparatus 100 is configured to check permissions database 110 before permitting authentication as a default procedure. In at least some embodiments, apparatus 100 is configured to revert the modification made to the information in permission database 110 to retract the assigned access to the device and/or service at the scheduled end time. In at least some embodiments, the device and/or service provider is configured to periodically check permissions database 110 while first user terminal 116 is accessing the device and/or service. In at least some embodiments, at the end of the scheduled time the users included in an authorized privilege access request no longer have access to device 114, and any remaining connections to device 114 are terminated.

Figure 2:
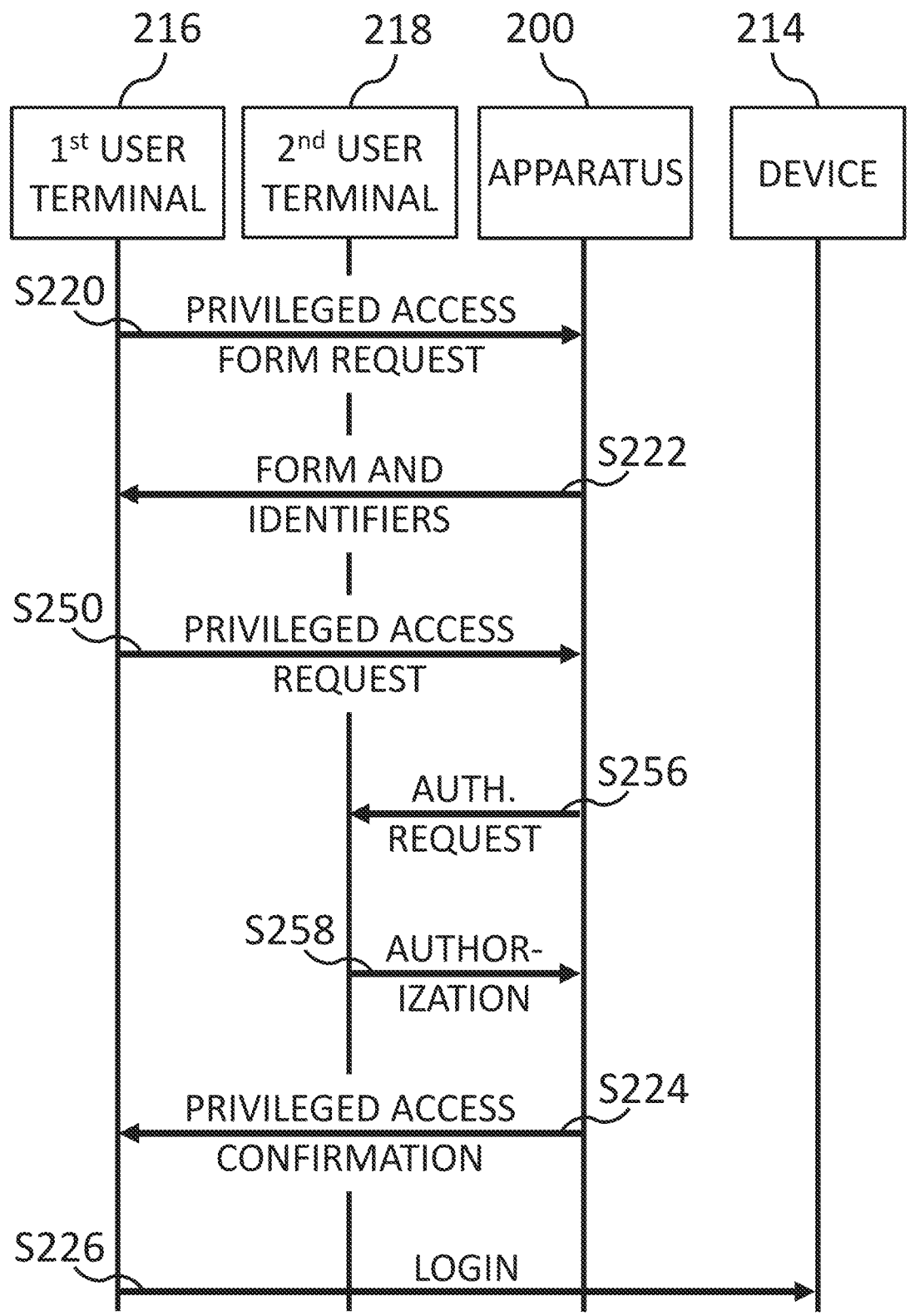
FIG. 2 is a communication flow for privileged access requesting, according to at least some embodiments of the present invention.

FIG. 2 is a communication flow for privileged access requesting, according to at least some embodiments of the present invention. The communication flow is conducted to perform a process of privileged access management. In at least some embodiments, the communication flow is conducted among a first user terminal 216, a second user terminal 218, an apparatus 200, and a device 214.

At S220, first user terminal 216 transmits a request for a privileged access request interface to apparatus 200. In at least some embodiments, apparatus 200 receives a request for the interface to compose the request for privileged access from a terminal via the interface.

At S222, apparatus 200 transmits the privilege access request interface to first user terminal 216. In at least some embodiments, apparatus 200 transmits a plurality of device identifiers, a plurality of user identifiers, and a plurality of privilege levels to the terminal, each device identifier identifying a device connected to the network, each user identifier identifying a user of the network. In at least some embodiments, first user terminal 216 displays a graphical user interface to enable a user to compose the privileged access request. In at least some embodiments, apparatus transmits the graphical user interface to first user terminal 216. In at least some embodiments, apparatus 200 is configured to receive a request from the user terminal 216 to access a device and/or service (e.g., access via an API, direct access, etc.). In one or more examples, apparatus 200 is configured to enable interactive selection of users, devices and services available, privilege level, duration of access, etc. In one or more examples, apparatus 200 is configured to host information for first user terminal 216 to display a graphical user interface, such as in a webpage accessible by first user terminal 216, in an application hosted in a server communicatively coupled to first user terminal 216, in an application installed on first user terminal 216, etc., that enables the user of first user terminal 216 to select, from one or more lists, users on behalf of which access is requested, the device(s) and/or service(s), the purpose for which access is requested, the privilege level of the requested access, and/or the duration of the requested access. In at least some embodiments, first user terminal 216 generates a graphical user interface that allows the first user to interact with apparatus 200. In at least some embodiments, first user terminal 216 retrieves a list of devices on the network to allow the first user to select the devices to generate the privileged access request. In at least some embodiments, first user device 216 determines a minimum privilege level that allows the first user to fulfil the purpose of the request. In at least some embodiments, first user device 216 determines whether the first user should receive read-only access, admin access, super admin access, or another privilege level based on the purpose of the request.

At S250, first user terminal 216 transmits a privileged access request to apparatus 200. In at least some embodiments, apparatus 200 receives a request from first user terminal 216 to access a device/service for a specific duration and purpose. In at least some embodiments, apparatus 200 is configured to receive requests from first user terminal 216 to request access to a device or a service on behalf of a user. In at least some embodiments, first user terminal 216 is configured to request access to the device or a service via an API. For example, in a network deployment, a field technician whose role is to maintain the device uses first user terminal 216 to transmit, to apparatus 200, a request to access the device for a limited time. In at least some embodiments, apparatus 200 associates a request identification (ID) with the privileged access request from the first user. In at least some embodiments, apparatus 200 stores a log of requests associated with an identifier of the first user in the permissions database. In at least some embodiments, apparatus 200 utilizes the request ID to keep track of the risk associated with the first user.

At S256, apparatus 200 transmits an authorization request to a second user via second user terminal 218. In at least some embodiments, apparatus 200 selects the second user, and transmits the authorization request to the user terminal associated with the second user, second user terminal 218. In at least some embodiments, apparatus 200 associates the privileged access request with the second user and adds the privileged access request to a list of privileged access requests. In at least some embodiments, apparatus 200 makes the list of privileged access requests available for viewing and interaction through a graphical user interface. In at least some embodiments, apparatus 200 transmits the authorization request to second user terminal 218 in response to the second user using second user terminal 218 to view the list of privileged access requests and select the privileged access request for viewing and approval.

In at least some embodiments, apparatus 200 requests the second user, such as the user of second user terminal 218, to authorize the request for privileged access received from first user terminal 216. In at least some embodiments, apparatus 200 presents a list of devices and services, the levels of privileged access, and the associated groups along with the request to the second user. In one or more examples, apparatus 200 presents the request to authorize to the second user via a graphical user interface, such as in a webpage accessible by second user terminal 218, in an application hosted in a server communicatively coupled to second user terminal 218, in an application installed on second user terminal 218, etc., that enables the second user to interactively review, select and/or change the parameters, such as privilege level, requested access duration, etc., of the request received from the first user terminal 216, and to transmit authorization of the request.

In at least some embodiments, apparatus 200 receives a request from the second user via second user terminal 218 to modify a role risk profile associated with the first user from compliant to non-compliant or vice versa. In at least some embodiments, apparatus 200 updates the role risk profile in the permissions database in response to the request.

At S258, second user terminal 218 transmits authorization to apparatus 200. In at least some embodiments, apparatus 200 receives authorization from second user terminal 218 and, in response to receiving the authorization, schedules a modification to a permissions database. In one or more embodiments, apparatus 200 associates a first user identifier with an identifier of device 214 according to the applicable privilege level to the permissions database, provisions device 214, or any other operations to implement the authorized privileged access. In at least some embodiments, apparatus 200 schedules the modification at the scheduled start time, and schedules another modification to revert the privileged access in the permissions directory at the scheduled end time. In at least some embodiments, apparatus 200 determines the start time and the end time based on the requested start time and end time. In at least some embodiments, apparatus 200 receives the start time and the end time with the authorization received from second user terminal 218. In at least some embodiments, apparatus 200 determines the start time, the end time, or both based on a workflow.

At S224, apparatus 200 transmits confirmation of the privileged access request to first user terminal 216. In at least some embodiments, apparatus 200 transmits the privileged access request confirmation to the user terminal currently associated with the first user. In at least some embodiments, apparatus 200 transmits the privileged access request confirmation to first user terminal 216 in response to the first user using first user terminal 216 to view the list of privileged access requests and select the privileged access request for viewing. In at least some embodiments, apparatus 200 determines a granular privilege level to the device based on a task included the request in response to receiving authorization from the second user. In at least some embodiments, apparatus 200 determines the least permissive privileged access for the first user to complete the task. In at least some embodiments, the granular privilege levels include read-only access, admin access, or super administrator access.

At S226, first user terminal 216 performs a login to device 214. In at least some embodiments, first user terminal 216 communicates directly with device 214 to provide credentials for performing the login. In at least some embodiments, device 214 communicates with the permissions database to verify the privilege level associated with the first user, and the permissions database will only reflect the authorized privilege level within the authorized time frame or duration. In at least some embodiments, the modification to the permissions database enables the first user or first user terminal 216 privileged access to device 214 based on an assigned role or group in the permissions database for the requested duration. In at least some embodiments, apparatus 200 enables privileged access during the requested duration to perform a task. In at least some embodiments, after the requested duration apparatus 200 removes the first user or first user terminal 216 from the assigned role or group in the permissions directory so that the first user or first user terminal 216 no longer has privileged access after the requested duration.

FIG. 3 is a graphical user interface of a form for privileged access requesting, according to at least some embodiments of the present invention. In at least some embodiments, the privileged access request interface is any type of interface (e.g., form, chart, table, etc.) which enables a user to enter specifics of a privileged access request. In at least some embodiments, the graphical user interface is presented by a display of a user terminal, such as first user terminal 116 of FIG. 1. In at least some embodiments, the graphical user interface is configured to interact with user input from the user terminal. In at least some embodiments, the graphical user interface is configured to receive and display information from an apparatus, such as apparatus 100 of FIG. 1 and apparatus 200 of FIG. 2. The graphical user interface shows a privileged access request interface 330 including a user field 332, a device field 334, a privilege level field 336, a starting time field 338, an ending time field 339, and a submission button 348. In at least some embodiments, privileged access request interface 330 includes more or less fields than illustrated in FIG. 3, and arrangement of the fields in privileged access request interface 330 varies from the arrangement illustrated in FIG. 3. In at least some embodiments, privileged access request interface 330 includes additional fields, such as a description field (e.g., for enabling the user to specify the reason of requesting the privileged access, etc.), an urgency level field (e.g., for enabling the user to specify the urgency of the request, etc.), etc. In at least some embodiments, user field 332, privilege level field 336, starting time field 338, ending time field 339, and other suitable fields are presented in multiple graphical user interfaces (e.g., multiple forms, a combination of a form and a table, etc.)

User field 332 is a listing of user identifiers. In at least some embodiments, user field 332 includes user identifiers for which privileged access is being requested. In at least some embodiments, user field 332 includes all user identifiers of the network, from which user identifiers are selected for the privileged access request. In at least some embodiments, user field 332 includes a group identifier, the group identifier associated with a plurality of user identifiers. User field 332 shows "User A9", "User 42", and "Group 7". A privileged access request composed as shown would effectively request privileged access for the user identified as "User A9", the user identified as "User 42", and all users belonging to "Group 7". In at least some embodiments, the user identifier of the user making the request is presented in a distinguishable manner (e.g., bold, highlighted, blinking, etc.), so that said user is easily identifiable from the listing of user identifiers. In at least some embodiments, user field 332 includes a search field to enable the user to search for a target user(s) or a target group(s) for which privileged access is being requested. In at least some embodiments, the search field is a search bar, wherein in response to user inputs of a keyword associated with the user identifiers of the target user(s) or the target group(s) user field 332 is updated to show only user identifiers partially or fully matching the inputted keyword. In at least some embodiments, the available user identifiers (e.g., all user identifiers of the network or user identifiers match the inputted keyword) are presented in a first portion of user field 332, and selected (via double-click, drag and drop, etc.) user identifiers are presented in a second portion of user field 332.

Device field 334 is a listing of device identifiers. In at least some embodiments, device field 334 includes device identifiers for which privileged access is being requested. In at least some embodiments, device field 334 includes all device identifiers of the network, from which device identifiers are selected for the privileged access request. In at least some embodiments, a device identifier identifies one of a router, a switch, or any other device in communication with the network. Device field 334 shows "Router 24" and "Switch 1A5". A privileged access request composed as shown would effectively request privileged access to the device identified as "Router 24" and the device identified as "Switch 1A5". In at least some embodiments, device field 334 includes a search field to enable the user to search for a target device(s) to which privileged access is being requested. In at least some embodiments, the search field is a search bar, wherein in response to user inputs of "device type", "vendor/service provider", "service", "domain" (e.g.—RAN, Core, etc.), "location type" (e.g.—Country, Prefecture, State, City, etc.), "location name" (e.g.—Japan, Osaka, etc.), a keyword, or any other information associated with the information of the target device(s) device field 334 is updated to show only device identifiers partially or fully matching the inputted keyword. In at least some embodiments, the available device identifiers (e.g., all device identifiers of the network or device identifiers match the inputted keyword) are presented in a first portion of device field 334, and selected (via double-click, drag and drop, etc.) device identifiers are presented in a second portion of device field 334.

Privilege level field 336 shows a privilege level associated with a bundle of permissions. In at least some embodiments, privilege level field 336 shows a privilege level at which privileged access is being requested. In at least some embodiments, privilege level field 336 shows all privilege levels recognized by an apparatus, such as apparatus 100 of FIG. 1, from which a privilege level is selected for the privilege access request. Privilege level field 336 shows "Edit access". A privileged access request composed as shown would effectively request a privileged access level identified as "Edit access" to the devices identified as "Router 24" and "Switch 1A5" for the users identified as "User A9", "User 42", and those belonging to "Group 7". In at least some embodiments, privilege level is defined by a role, such as a reader role, an editor role, an admin role, etc., and each role has multiple privileged accesses associated thereto (e.g., an editor role has edit access, download access, and view access, a reader role has view access and download access, etc.). In at least some embodiments, privilege level field 336 includes a drop-down list presenting privilege level(s) available to the user making the request, privilege level(s) available to the user(s) and/or group(s) selected in field 332, privilege level(s) available to the device(s) selected in field 334, and/or a combination thereof.

Starting time field 338 shows a starting time at which privileged access is being requested. In at least some embodiments, starting time field 338 includes a date and a time. In at least some embodiments, starting time field 338 represents the date and time at which a permissions database is modified based on the privileged access request. Starting time field 338 shows "5/11 09:30". A privileged access request composed as shown would effectively request a modification of the permissions database, such as permissions database 110 of FIG. 1, at 9:30 AM on May 11. In at least some embodiments, starting time field 338 is an input field in which the user directly specifies a portion of the intended starting time. In some embodiments, starting time field 338 is associated with a pop-out calendar, wherein the pop-out calendar is presented to the user for selecting the desired date and time, in response to receipt of a trigger action (e.g., clicking on the starting time field 338, pressing a shortcut key, etc.) from the user.

Ending time field 339 shows an ending time at which privileged access is being requested. In at least some embodiments, ending time field 339 includes a date and a time. In at least some embodiments, ending time field 339 represents the date and time at which a permissions database is reverted from the modification based on the privileged access request. Ending time field 339 shows "5/11 15:00". A privileged access request composed as shown would effectively request a reversion of the modification of the permissions database, such as permissions database 110 of FIG. 1, at 3:00 PM on May 11. In at least some embodiments, a duration of time is included in privileged access request interface 330 instead of ending time field 339. In at least some embodiments, ending time field 338 is an input field in which the user directly specifies a portion of the intended ending time. In some embodiments, ending time field 338 is associated with a pop-out calendar, wherein the pop-out calendar is presented to the user for selecting the desired date and time, in response to receipt of a trigger action (e.g., clicking on the ending time field 338, pressing a shortcut key, etc.) from the user.

Submission field 348 is an area of privileged access request interface 330 that performs an action upon interaction therewith. In at least some embodiments, submission field 448 is presented in a form of a button, a checkbox, or in any other suitable forms which allow the user to trigger to thereby perform said action. In at least some embodiments, submission field 348 is configured to transmit the privileged access request composed in privileged access request interface 330 in response to input from the user terminal. In at least some embodiments, submission field 348 causes the user terminal to transmit contents of the privileged access request interface through an API of an apparatus, such as apparatus 100 of FIG. 1.

Figure 4:
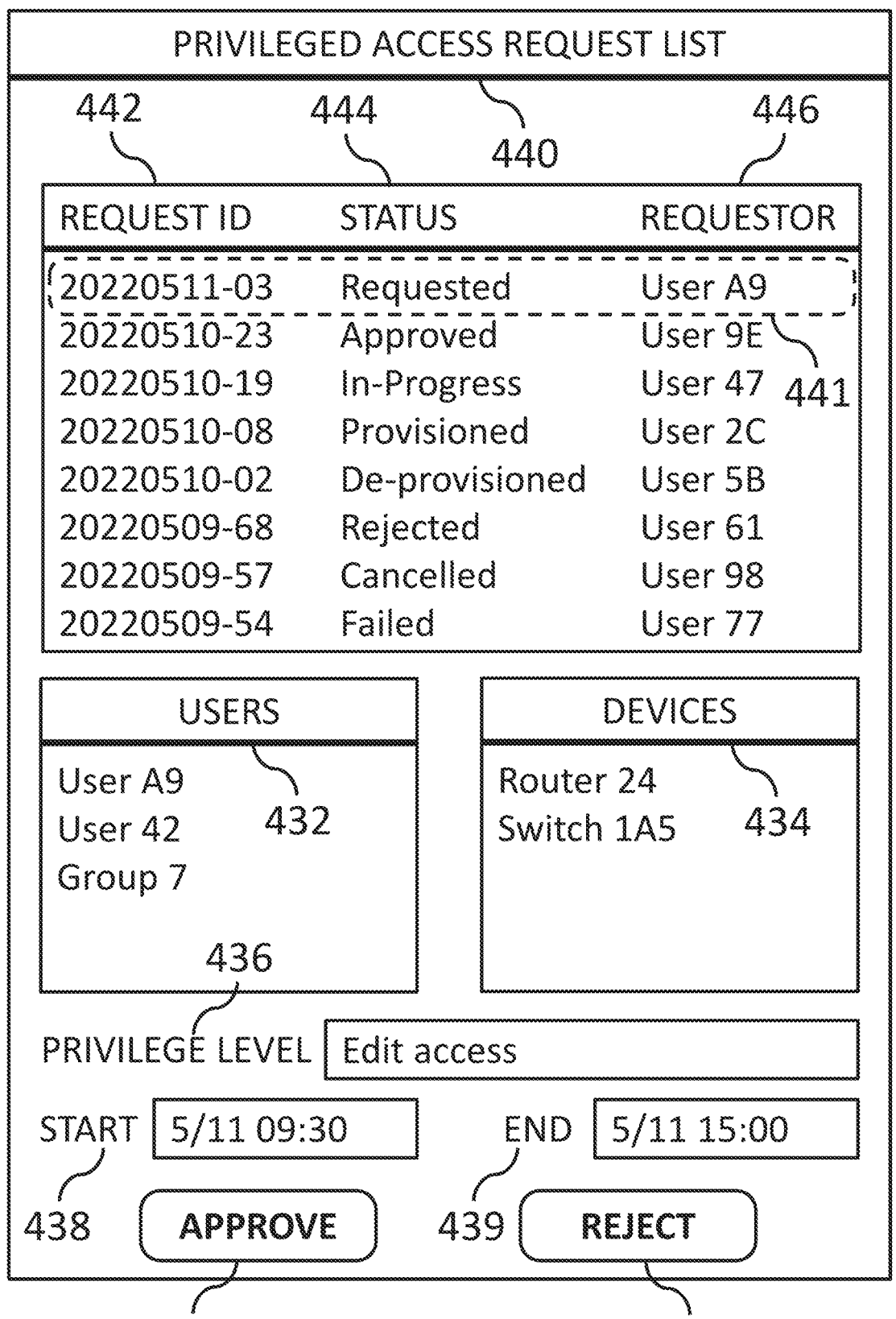
FIG. 4 is a graphical user interface for privileged access request review, according to at least some embodiments of the present invention.

FIG. 4 is a graphical user interface for privileged access request review, according to at least some embodiments of the present invention. In at least some embodiments, the privileged access request review interface is any type of interface (e.g., form, chart, table, etc.) which enables a user to review and modify specifics of a privileged access request, and to approve or reject the privileged access request. In at least some embodiments, the graphical user interface is presented by a display of a user terminal, such as second user terminal 118 of FIG. 1 and second user terminal 218 of FIG. 2. In at least some embodiments, the graphical user interface is configured to interact with user input from the user terminal. In at least some embodiments, the graphical user interface is configured to receive and display information from an apparatus, such as apparatus 100 of FIG. 1. The graphical user interface shows a privileged access request list 440 including a list of privileged access requests, such as privileged access request 441, a user field 432, a device field 434, a privilege level field 436, a starting time field 438, an ending time field 439, an approval field 448, and a rejection field 449. In at least some embodiments, privileged access request list 440 includes more or less fields than illustrated in FIG. 4, and arrangement of the fields in privileged access request list 440 varies from the arrangement illustrated in FIG. 4. In at least some embodiments, privileged access request list 440 includes additional fields, such as a description field (e.g., for enabling the user to review the reason of requesting the privileged access, etc.), an urgency level field (e.g., for enabling the user to review the urgency of the request, etc.), etc. In at least some embodiments, user field 432, privilege level field 436, starting time field 438, ending time field 439, and other suitable fields are presented in multiple graphical user interfaces (e.g., multiple forms, a combination of a form and a table, etc.)

Privileged access request list 440 shows, for each privileged access request, a request identifier 442, a request status 444, and a requestor 446. Privileged access request list 440 shows, for each privileged access request, a request identifier 442, a request status 444, and a requestor 446. Privileged access request 441 shows "20220511-03" as request identifier 442, "Requested" as request status 444, and "User A9" as requestor 446. In at least some embodiments, privileged access request list 440 includes more or less information than illustrated in FIG. 4. In at least some embodiments, privileged access request list 440 includes a time at which the request was created, a time at which the request was modified, an identifier of the user who modified the request, an urgency level of the request, and any other suitable information enabling a user to review all details of the request for making a decision (e.g., approval, rejection, etc.) based thereon.

Privileged access request list 440 is configured to display further details of a listed privileged access request in response to input from the user terminal. Privileged access request 441 is highlighted to indicate that the details of privileged access request 441 are shown in user field 432, device field 434, privilege level field 436, starting time field 438, and ending time field 439.

User field 432, device field 434, privilege level field 436, starting time field 438, and ending time field 439 are substantially similar in structure and function to user field 332, device field 334, privilege level field 336, starting time field 338, and ending time field 339 of FIG. 3, respectively, except as expressly distinguished. In at least some embodiments, privileged access request list 440 is configured to modify the contents of user field 432, device field 434, privilege level field 436, starting time field 438, and ending time field 439 in response to input from the user terminal.

Approval field 448 is an area of privileged access request list 440 that performs an action upon interaction therewith. In at least some embodiments, approval field 448 is presented in a form of a button, a checkbox, or in any other suitable forms which allow the user to trigger to thereby perform said action. In at least some embodiments, approval field 448 is configured to transmit authorization of the selected (e.g., highlighted) privileged access request in response to receiving an input from the user terminal. In at least some embodiments, approval field 448 causes the user terminal to transmit authorization of the highlighted privileged access request through an API of an apparatus, such as apparatus 100 of FIG. 1. In at least some embodiments, approval field 448 is configured to transmit authorization of the highlighted privileged access request along with contents of user field 432, device field 434, privilege level field 436, starting time field 438, and ending time field 439 in response to input from the user terminal. In at least some embodiments, modification of the parameters/contents presented in one or more of user field 432, device field 434, privilege level field 436, starting time field 438, and ending time field 439 of a privileged access request is possible upon receiving input from a user device, before approving said privileged access request.

Rejection field 449 is an area of privileged access request list 440 that performs an action upon interaction therewith. In at least some embodiments, approval field 448 is presented in a form of a button, a checkbox, or in any other suitable forms which allow the user to trigger to thereby perform said action. In at least some embodiments, rejection field 449 is configured to transmit rejection of the selected (e.g., highlighted) privileged access request in response to receiving an input from the user terminal. In at least some embodiments, rejection field 449 causes the user terminal to transmit rejection of the highlighted privileged access request through an API of an apparatus, such as apparatus 100 of FIG. 1. In at least some embodiments, in response to receiving an input from the user terminal on the rejection field 449, a comment window is presented to enable the user to specify the reason(s) of rejection, before the rejection is transmitted.

FIG. 5 is a portion of a permissions database 510, according to at least some embodiments of the present invention. The portion shows an entry for a user identified as "User A9". The entry includes a privilege level that the user is assigned as default, which may be defined by a role assigned to the user upon registration. For instance, a user registered as a reader will be assigned a reader role, wherein said role may have a basic privilege(s) (e.g., read privilege) which applies to all users having the same role. The default privilege level of "User A9" is indicated as "Read-Only". The entry further includes devices with which the user is assigned a privilege level of edit. "User A9" is assigned edit privilege level with "Router 43" and "Switch 26A". The entry further includes devices with which the user is assigned a privilege level of admin. "User A9" is not assigned admin privilege level with any devices. The entry further includes devices with which the user is assigned the ability to authorize privileged access requests. "User A9" is not assigned the ability to authorize privileged access requests with any devices.

FIG. 6 is a portion of an inventory database 608, according to at least some embodiments of the present invention. The portion shows an entry for a device identified as "Router 24". The entry includes users assigned an edit privilege level for the device. "Group 5", which represents a plurality of user identifiers, is assigned an edit privilege level with "Router 24". The entry includes users assigned an admin privilege level for the device. "User 7A" is assigned an admin privilege level with "Router 24". The entry includes users assigned the ability to authorize privileged access requests for the device. "User E2" is assigned the ability to authorize privileged access requests for "Router 24".

Figure 7:
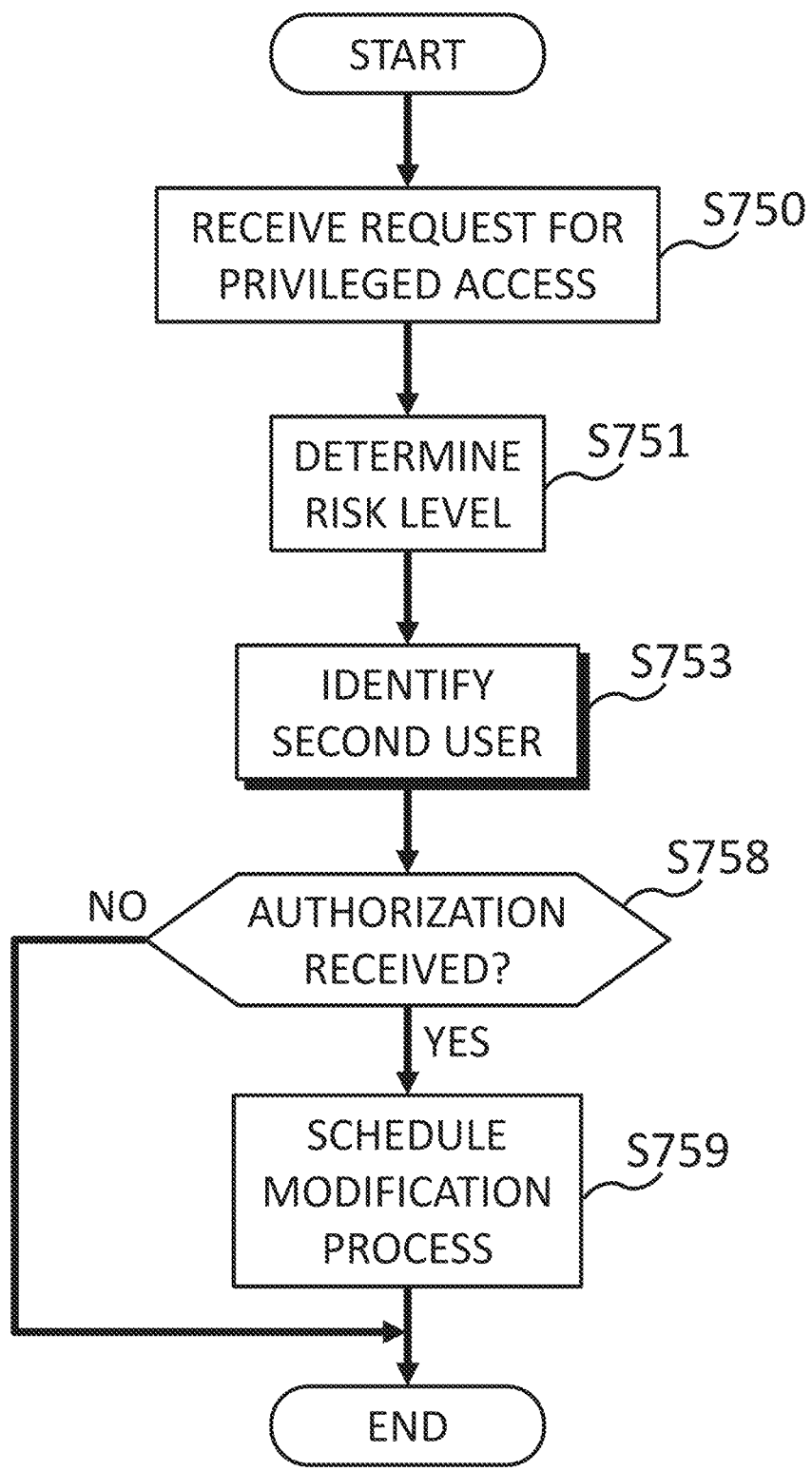
FIG. 7 is an operational flow for privileged access requesting, according to at least some embodiments of the present invention.

FIG. 7 is an operational flow for privileged access requesting, according to at least some embodiments of the present invention. The operational flow provides a method of privileged access requesting. In at least some embodiments, one or more operations of the method are executed by a controller of an apparatus including sections for performing certain operations, such as the controller and apparatus shown in FIG. 10, which will be explained hereinafter.

At S750, a receiving section receives a request for privileged access. In at least some embodiments, the receiving section receives a request for privileged access to a device connected to a network. In at least some embodiments, the receiving section receives a request for a service that is provided via a device connected to a network, and thus requires privileged access to the device. In at least some embodiments, the request incudes a start time for the access, an end time for the access, a purpose of the request, a level of privilege associated with the access request, an identifier of a user/group for which the privileged access is requested, or the like. In at least some embodiments, the receiving section receives an identifying information of the first user, such as through a user ID, biometric information, or the like. In at least some embodiments, the receiving section associates a request identification (ID) with the request from the first user. In one or more examples, the receiving section associates the request ID with all privileged access requests received from the user. In at least some embodiments, the controller stores a log of privileged access requests associated with the first user in the permissions database.

At S751, a determining section determines a risk level of the privileged access request. In at least some embodiments, the determining section determines a risk level associated with the request based on a duration of the privileged access, a device identifier, a first user identifier, a requested privilege level included in the request, and/or any other suitable information. In at least some embodiments, the determining section retrieves a risk profile (e.g., risk associated with the assigned role, etc.) for the first device, and determines the risk level for the request based at least in part on the risk profile for the first device.

In at least some embodiments, the privileged access request includes a task to be performed instead of a privilege level. In at least some embodiments, the determining section determines the privilege level that enables the first user to perform a task included in the privileged access request. For example, in response to receiving a request for privileged access to read an event log within a device for troubleshooting, the determining section determines the minimum privilege level required to read the event log within the device, which in this case is enabled by providing read-only access to the device. In at least some embodiments, the determining section determines a minimum privilege level, among read-only access, edit access, admin access, and/or any other suitable privilege access, that enables the first user to perform a task included in the request. In at least some embodiments, the determining section replaces the requested privilege level in the request with the minimum privilege level.

At S753, an identifying section identifies a second user to authorize the privileged access request. In at least some embodiments, the identifying section identifies a second user to control authorization of the device based on the determined risk level. In at least some embodiments, the identifying section stores the request in association with a second user identifier in response to identifying the second user. In at least some embodiments, the identifying section transmits the request for privileged access to a terminal associated with the second user. In at least some embodiments, the second user is a group of users, and the identifying section identifies the group of users to control authorization of the device based on the determined risk level. In at least some embodiments, any user of the group of users is enabled to accept to review the privileged access request by triggering an interactive element (e.g., a button, a checkbox, etc.) on a terminal associated with the group of users or associated with the user of the group of users. In at least some embodiments, the identifying section subsequently associates the request with the user identifier of the user of the group of users that accepted review, in a manner so that only the associated user of the group of users is enabled to review the privileged access request and provide authorization thereafter.

At S758, an authorization receiving section determines whether authorization of the privileged access request is received. In at least some embodiments, the authorization receiving section receives a risk profile for the first user from an administrative user based on the list of roles or groups associated with the first user. In at least some embodiments, the authorization receiving section determines whether the first user associated with the role or group has a risk profile in the permissions database. In at least some embodiments, the authorization receiving section labels the first user associated with role or group as compliant or non-compliant based on the determination that the first user associated with the role or group has or does not have a risk profile. In at least some embodiments, the authorization receiving section determines whether the first user associated with a role or group is non-compliant based on a determination that a risk profile for the role or group of the first user that has not been configured or approved (e.g., by the second user, by the administrative user, etc.) In at least some embodiments, the apparatus is configured to deny the first user (associated with roles or groups that are non-compliant) the privileged access request. If the authorization receiving section determines that authorization is received, then the operational flow proceeds to modification process scheduling at S759. If the authorization receiving section determines that authorization is not received, such as when rejection of the privileged access request is received, then the operational flow ends. In at least some embodiments, the authorization receiving section transmits a notification message indicating that the privileged access request was unsuccessful to the terminal of the first user in response to determining that authorization is not received. In at least some embodiments, the notification message includes comments from the second user specifying the reason(s) why the privileged access request is unsuccessful or rejected.

At S759, a scheduling section schedules a modification process of a permissions database. In at least some embodiments, the scheduling section schedules, in response to receiving authorization from the second user, a process to modify an entry in a permissions database to associate the first user identifier and the device identifier with the requested privilege level (which may be the minimum privilege level determined in S751) for the requested duration. In at least some embodiments, in response to receiving authorization for the first user to access the requested device and/or service, the scheduling section provides time-limited access to the device and/or service for the first user. In at least some embodiments, the scheduling section updates the information in the permissions database at the starting time to enable a user terminal with credentials of the first user to access the device during the scheduled time. In at least some embodiments, the scheduling section schedules a first process to modify the entry in the permissions database to associate the first user identifier and the device identifier with the requested privilege level (instead of a current privilege level) at a starting time included in the request, and schedules a second process to modify the entry in the permissions database to associate the first user identifier and the device identifier with the current privilege level of the first user before the modification of the entry (instead of the requested privilege level) at an ending time included in the request. For example, in response to receiving a request for privileged access to read an event log within a device for troubleshooting, the scheduling section schedules a modification of the access control information in the permissions database at the scheduled time to provide the first user with read-only access to the device, and schedules a modification of the access control information in the permissions database to retract the read-only access to the device and/or service at expiration of the time limit for which the authorization was approved. In at least some embodiments, the scheduling section schedules a process to modify an entry in the permissions database that provisions the first user with the determined granular privilege level to the device at a scheduled start time based on the privileged access request. In at least some embodiments, the scheduling section generates a script, such a CRON script, that executes instructions at a predetermined time.

Figure 8:
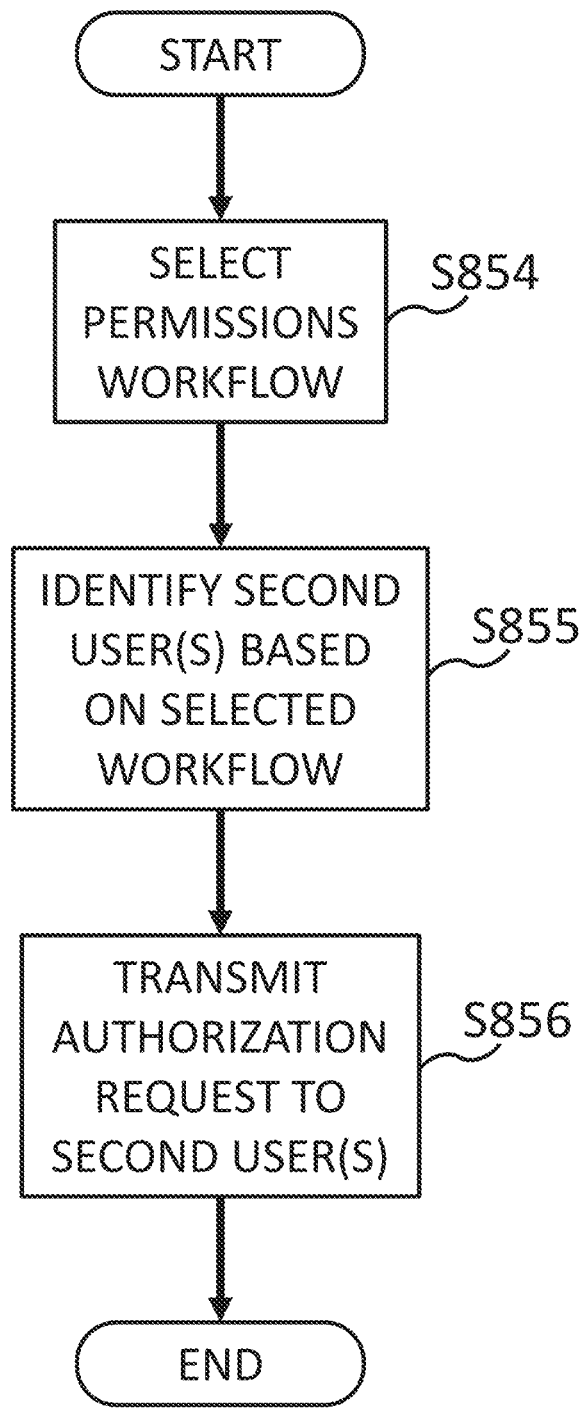
FIG. 8 is an operational flow for second user identification, according to at least some embodiments of the present invention.

FIG. 8 is an operational flow for second user identification, according to at least some embodiments of the present invention. The operational flow provides a method of second user identification. In at least some embodiments, one or more operations of the method are executed by an identifying section of an apparatus, such as the apparatus shown in FIG. 10, which will be explained hereinafter.

At S854, the identifying section or a sub-section thereof selects a approval workflow for the privileged access request. In at least some embodiments, the identifying section selects a approval workflow for the request based on the risk level. In at least some embodiments, the identifying section selects a approval workflow that identifies an approver or the steps for approval of the request. In at least some embodiments, the identifying section determines an appropriate approval workflow based on the risk level associated with the first user or a device and/or service provider for which access is being requested. In at least some embodiments, the identifying section dynamically determines the risk level associated with the first user. For example, the determined risk level associated with the first user varies with the details of the privileged access request. In at least some embodiments, the identifying section selects a approval workflow based on information from the inventory database regarding the device, the topology of the device, information from the permissions database, and the like.

In at least some embodiments, the identifying section selects the workflow based on risk factors. In one or more examples, the identifying section determines the risk level based on a service risk, an impact risk or both. In at least some embodiments, the identifying section determines the service risk based on a probability that the first user will cause a problem or introduce a risk. In one or more examples, the probability that the first user terminal causes a problem or introduces a risk is determined based on the experience history of the first user, prior problems cause by the first user, the time elapsed between the prior problem and the current request, or the like. In at least some embodiments, the identifying section determines the risk level based on a role requested or associated with a request. In one or more examples, the identifying section determines the risk associated with the request based on the privilege level to perform the task included in the request. Examples of privilege levels include, read-only, admin, super-admin, or the like. In at least some embodiments, the identifying section selects the workflow based on a threshold value for the service risk associated with a role of the first user when using the service. In at least some embodiments, the identifying section determines the risk level based on the length of time the privilege access is requested, the risk profile associated with a device or a user and the like.

At S855, the identifying section or a sub-section thereof identifies a second user based on the workflow selected at S854. In at least some embodiments, the identifying section identifies the second user based on the approval workflow. In at least some embodiments, the identifying section determines whether a second user controls the authorization to access the device based on the approval workflow. In at least some embodiments, the identifying section determines whether the second user has authority to authorize approval of the request based on the steps in the approval workflow. In at least some embodiments, the controller requests authorization from another user or an additional user, such as the super administrator, based on the risk level. In at least some embodiments, the identifying section determines whether to request a second authorization based on the workflow.

At S856, the identifying section or a sub-section thereof transmits an authorization request to the second user identified at S855. In at least some embodiments, the identifying section transmits a request for authorization to a terminal associated with the second user. In at least some embodiments, the identifying section presents the list of groups or roles associated with the first user to the second user via an API. In at least some embodiments, the identifying section enables the second user to visualize, through a user terminal, the groups or roles associated with the first user, the services that are related to the first user, all details of or the essential information of the privileged access request, and the like. In at least some embodiments, the identifying section transmits an authorization request to a third user in response to determining to request a second authorization based on the risk level or the workflow.

Figure 9:
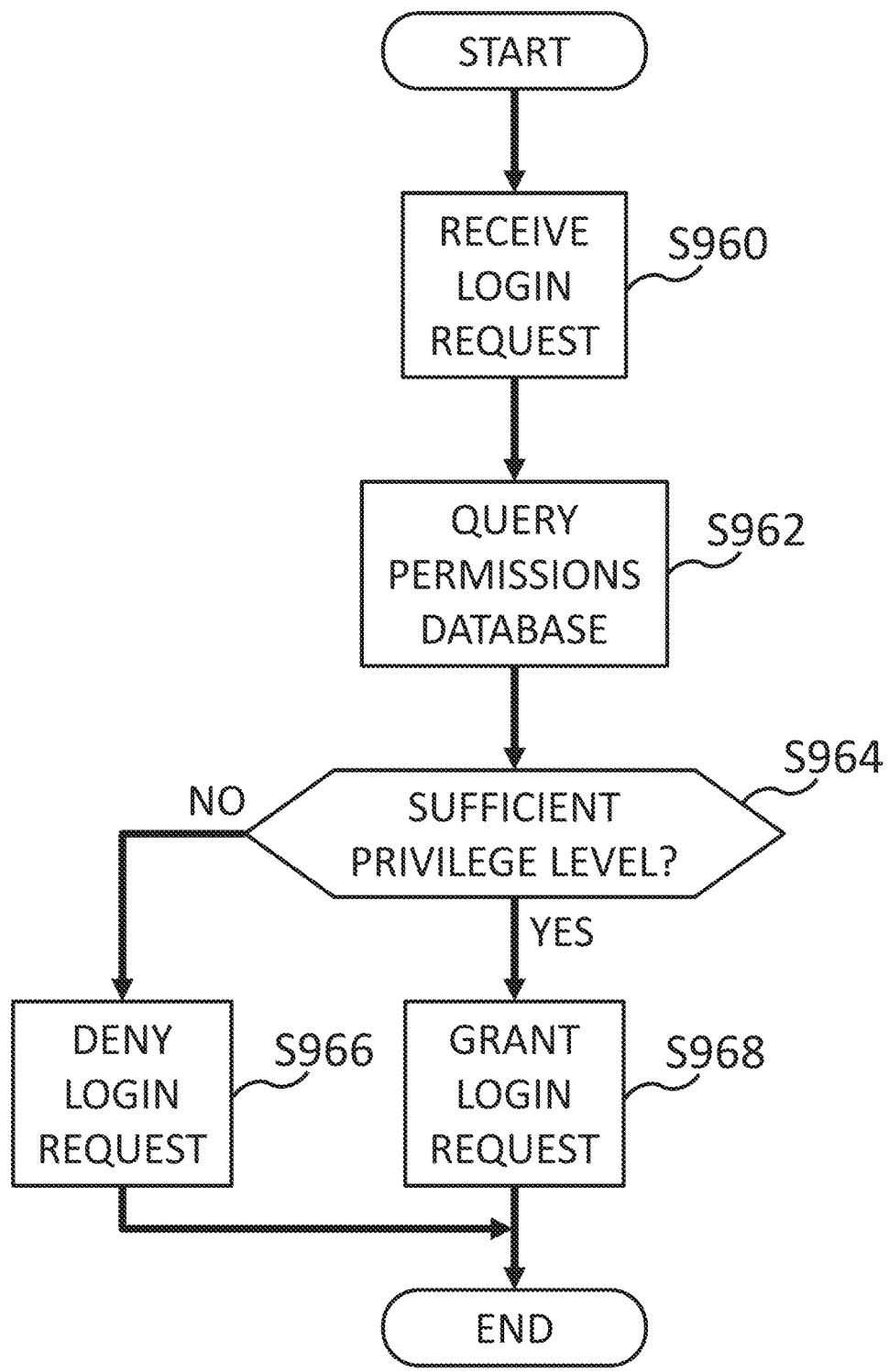
FIG. 9 is an operational flow for privileged access control, according to at least some embodiments of the present invention.

FIG. 9 is an operational flow for privileged access control, according to at least some embodiments of the present invention. The operational flow provides a method of privileged access control. In at least some embodiments, one or more operations of the method are executed by a controller of an apparatus, such as the controller shown in FIG. 10, which will be explained hereinafter.

At S960, the controller or a section thereof receives a login request. In at least some embodiments, the controller receives a request for login to the device, the request including the first user identifier and the device identifier. In at least some embodiments, the controller receives a login request from a device on the network in response to the device receiving the login request from a user terminal of the first user. In at least some embodiments, the controller receives a login request from the first user on the device on the network.

At S962, the controller or a section thereof queries a permissions database. In at least some embodiments, the controller queries the permissions database for a current privilege level associated with the first user identifier and the device identifier. In at least some embodiments, the controller determines whether a user of a user terminal is authorized to access the requested device and/or service based on information retrieved from the permissions database. For example, the controller determines whether the user is authorized to access a router in the DU based on the privilege level included in the information retrieved from the permission database. In at least some embodiments, the controller determines whether the first user is authorized to access the device based on an access request query to the permissions database. In at least some embodiments, the controller, based on a determination that the first user is authorized to access the device, allow the first user to access the device consistent with the privilege level.

In at least some embodiments, the controller retrieves a list of groups or roles associated with the first user identifier from the permissions database. In at least some embodiments, the list of groups or roles associated with a user identified by the first user identifier includes the roles/groups of the user, the services created by the user, devices configured by the user, the services managed by the user, the devices managed by the user, or the like. In at least some embodiments, the controller retrieves the list of groups/roles associated with the first user identifier based on the first user identifier supplied by a user terminal to log into the system.

In at least some embodiments, the controller retrieves the list of roles/groups associated with a vendor or a service provider based on the request to access a device in the network from the user identified by the first user identifier on behalf of the vendor/service provider. In at least some embodiments, the controller receives information about the vendor/service provider from the first user identifier when the list of roles/groups associated with the vendor/service provider is not available.

At S964, the controller determines whether there is sufficient privilege level to grant the login request received at S960. In at least some embodiments, the controller determines whether there is sufficient privilege level based on the privilege level included in the information retrieved from the permission database and a privilege level included in the login request. If the controller determines that there is sufficient privilege level to grant the login request, then the operational flow proceeds to grant the login request at S968. If the controller determines that there is insufficient privilege level to grant the login request, then the operational flow proceeds to deny the login request at S966. In at least some embodiments, the controller determines the group to which the user belongs, and determines, based on the group, whether the user is authorized to access the requested device and/or service.

At S966, the controller denies the login request. In at least some embodiments, if access to the device and/or service is restricted to a special user, such as an administrator with privileges that are elevated compared to other users or to other administrators, then the user is unable to access the device and/or service unless the permissions database is modified. In at least some embodiments, the controller generates an alert, such as an audio or visual alert, to indicate a potential attempt to breach the network, in response to a determination that the user is not authorized to access the requested device and/or service. In at least some embodiments, the controller transmits the alert to a system administrator. In at least some embodiments, the controller transmits a notification message to the first user (i.e., the user providing the login request) indicating that the first user does not have sufficient privilege level to access the requested device and/or service. In at least some embodiments, the notification message includes an interactive element (e.g., a hyperlink, a button, etc.) which, upon triggering by the first user, redirects the first user to an interface (e.g., privileged access request interface described above in relation to FIG. 3, etc.) for creating a privileged access request for accessing the requested device and/or service.

At S968, the controller grants the login request. In at least some embodiments, the controller grants the request for login according to the current privilege level associated with the first user identifier and the device identifier in the permissions database.

Figure 10:
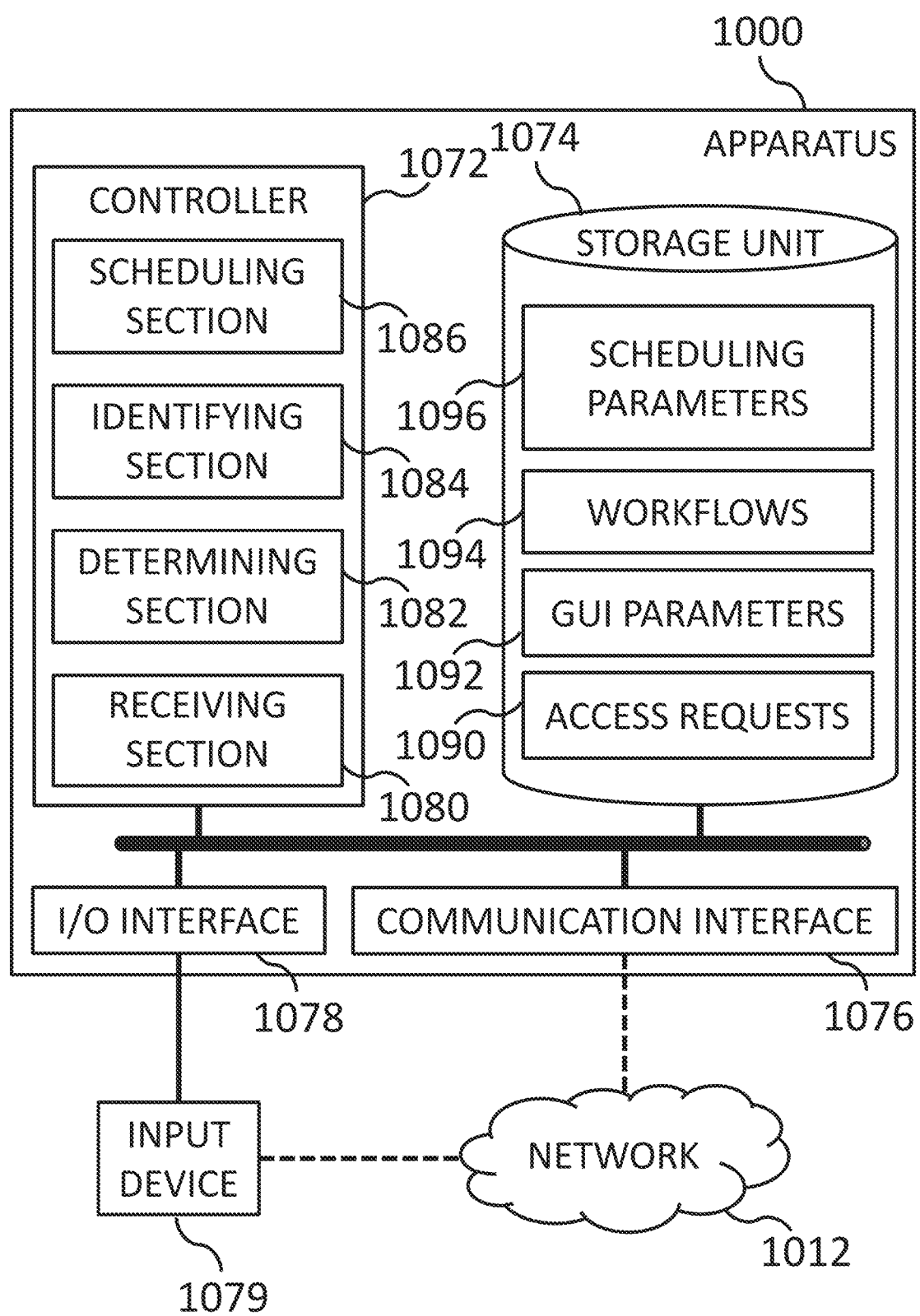
FIG. 10 is a block diagram of a hardware configuration for privileged access requesting, according to at least some embodiments of the present invention.

FIG. 10 is a block diagram of a hardware configuration for privileged access requesting, according to at least some embodiments of the present invention.

The exemplary hardware configuration includes apparatus 1000, which communicates through network 1012, and interacts with input device 1079. In at least some embodiments, apparatus 1000 is a computer or other computing device that receives input or commands from input device 1079. In at least some embodiments, apparatus 1000 is a host server that connects directly to input device 1079, or indirectly through network 1012. In at least some embodiments, apparatus 1000 is a computer system that includes two or more computers. In at least some embodiments, apparatus 1000 is a personal computer that executes an application for a user of apparatus 1000.

Apparatus 1000 includes a controller 1072, a storage unit 1074, a communication interface 1076, and an input/output interface 1078. In at least some embodiments, controller 1072 includes a processor or programmable circuitry executing instructions to cause the processor or programmable circuitry to perform operations according to the instructions. In at least some embodiments, controller 1072 includes analog or digital programmable circuitry, or any combination thereof. In at least some embodiments, controller 1072 includes physically separated storage or circuitry that interacts through communication. In at least some embodiments, storage unit 1074 includes a non-volatile computer-readable medium capable of storing executable and non-executable data for access by controller 1072 during execution of the instructions. Communication interface 1076 transmits and receives data from network 1012. Input/output interface 1078 connects to various input and output units, such as input device 1079, via a parallel port, a serial port, a keyboard port, a mouse port, a monitor port, and the like to accept commands and present information. In some embodiments, storage unit 1074 is external from apparatus 1000. In some embodiments, storage unit 1074 is a cluster of servers, and one or more of the data stored in storage unit 1074 is stored in multiple servers.

Controller 1072 includes receiving section 1080, determining section 1082, identifying section 1084, and scheduling section 1086. Storage unit 1074 includes access requests 1090, graphical user interface parameters 1092, workflows 1094, and scheduling parameters 1096.

Receiving section 1080 is the circuitry or instructions of controller 1072 configured to receive privileged access requests. In at least some embodiments, receiving section 1080 is configured to receive a request for privileged access to a device connected to a network. In at least some embodiments, receiving section 1080 stores information in storage unit 1074, such as access requests 1090 and utilizes information in storage unit 1074, such as graphical user interface parameters 1092. In at least some embodiments, receiving section 1080 includes sub-sections for performing additional functions, as described in the foregoing flow charts. In at least some embodiments, such sub-sections is referred to by a name associated with a corresponding function.

Determining section 1082 is the circuitry or instructions of controller 1072 configured to determine risk levels. In at least some embodiments, determining section 1082 is configured to determine a risk level associated with the request based on a duration of the privileged access, a device identifier, a first user identifier, and a requested privilege level included in the request. In at least some embodiments, determining section 1082 utilizes information in storage unit 1074, such as workflows 1094. In at least some embodiments, determining section 1082 includes sub-sections for performing additional functions, as described in the foregoing flow charts. In at least some embodiments, such sub-sections is referred to by a name associated with a corresponding function.

Identifying section 1084 is the circuitry or instructions of controller 1072 configured to identify second users to authorize privileged access requests. In at least some embodiments, identifying section 1084 is configured to identify a second user to control authorization of the device based on the risk level. In at least some embodiments, identifying section 1084 utilizes information from storage unit 1074, such as access requests 1090 and workflows 1094. In at least some embodiments, identifying section 1084 includes sub-sections for performing additional functions, as described in the foregoing flow charts. In at least some embodiments, such sub-sections is referred to by a name associated with a corresponding function.

Scheduling section 1086 is the circuitry or instructions of controller 1072 configured to schedule modifications to a permissions database. In at least some embodiments, scheduling section 1086 is configured to schedule, in response to receiving authorization from the second user, a process to modify an entry in a permissions database to associate the first user identifier and the device identifier with the requested privilege level for the duration. In at least some embodiments, scheduling section 1086 utilizes information from storage unit 1074, such as scheduling parameters 1096. In at least some embodiments, scheduling section 1086 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least some embodiments of the present invention, privileged access is managed by receiving a request for privileged access to a device connected to a network, determining a risk level associated with the request based on a duration of the privileged access, a device identifier, a first user identifier, and a requested privilege level included in the request, identifying a second user to control authorization of the device based on the risk level, and scheduling, in response to receiving authorization from the second user, a process to modify an entry in a permissions database to associate the first user identifier and the device identifier with the requested privilege level for the duration.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable storage medium including instructions executable by a computer to cause the computer to perform operations comprising:
   receiving a request for privileged access to a device connected to a network;
   determining a risk level associated with the request based on at least one of a duration of the privileged access, a device identifier, a first user identifier, and a requested privilege level included in the request;
   identifying a second user to control authorization of the device based on the risk level; and
   scheduling, in response to receiving authorization from the second user, a process to modify an entry in a permissions database to associate the first user identifier and the device identifier with the requested privilege level for the duration;
   wherein a graphical user interface (GUI) is generated for retrieving a list of devices connected to the network, displaying the list of devices, and receiving a selection of the device from the first user to generate the request.

2. The computer-readable storage medium of claim 1, wherein the operations further comprise:
   selecting an approval workflow for the request based on the risk level;
   wherein the identifying the second user is based on the approval workflow.

3. The computer-readable storage medium of claim 1, wherein the operations further comprise transmitting a request for authorization to a terminal associated with the second user.

4. The computer-readable storage medium of claim 1, wherein the operations further comprise:
   storing the request in association with a second user identifier in response to identifying the second user; and
   transmitting the request for privileged access to a terminal associated with the second user.

5. The computer-readable storage medium of claim 1, wherein the scheduling includes
   scheduling a first process to modify the entry in the permissions database to associate the first user identifier and the device identifier with the requested privilege level instead of a current privilege level at a starting time included in the request, and
   scheduling a second process to modify the entry in the permissions database to associate the first user identifier and the device identifier with the current privilege level instead of the requested privilege level at an ending time included in the request.

6. The computer-readable storage medium of claim 1, wherein the operations further comprise:
   receiving a request to compose the request for privileged access from a terminal; and
   transmitting a plurality of device identifiers, a plurality of user identifiers, and a plurality of privilege levels to the terminal, each device identifier identifying a device connected to the network, each user identifier identifying a user of the network.

7. The computer-readable storage medium of claim 1, wherein the operations further comprise determining a minimum privilege level, among read-only access, edit access, or admin access, that enables the first user to perform a task included in the request.

8. The computer-readable storage medium of claim 1, wherein the operations further comprise replacing the requested privilege level in the request with a minimum privilege level.

9. The computer-readable storage medium of claim 1, wherein the operations further comprise:
   receiving a request for login to the device, the request including the first user identifier and the device identifier;
   querying the permissions database for a current privilege level associated with the first user identifier and the device identifier; and
   granting the request for login according to the current privilege level associated with the first user identifier and the device identifier in the permissions database.

10. A method comprising:
    receiving a request for privileged access to a device connected to a network;
    determining a risk level associated with the request based on a duration of the privileged access, a device identifier, a first user identifier, and a requested privilege level included in the request;
    identifying a second user to control authorization of the device based on the risk level; and
    scheduling, in response to receiving authorization from the second user, a process to modify an entry in a permissions database to associate the first user identifier and the device identifier with the requested privilege level for the duration;
    wherein a graphical user interface (GUI) is generated for retrieving a list of devices connected to the network, displaying the list of devices, and receiving a selection of the device from the first user to generate the request.

11. The method of claim 10, further comprising:
    selecting an approval workflow for the request based on the risk level;
    wherein the identifying the second user is based on the approval workflow.

12. The method of claim 10, further comprising transmitting a request for authorization to a terminal associated with the second user.

13. The method of claim 10, further comprising:
    storing the request in association with a second user identifier in response to identifying the second user; and
    transmitting the request for privileged access to a terminal associated with the second user.

14. The method of claim 10, wherein the scheduling includes
   scheduling a first process to modify the entry in the permissions database to associate the first user identifier and the device identifier with the requested privilege level instead of a current privilege level at a starting time included in the request, and
   scheduling a second process to modify the entry in the permissions database to associate the first user identifier and the device identifier with the current privilege level instead of the requested privilege level at an ending time included in the request.

15. The method of claim 10, further comprising:
   receiving a request to compose the request for privileged access from a terminal; and
   transmitting a plurality of device identifiers, a plurality of user identifiers, and a plurality of privilege levels to the terminal, each device identifier identifying a device connected to the network, each user identifier identifying a user of the network.

16. The method of claim 10, further comprising determining a minimum privilege level, among read-only access, edit access, or admin access, that enables the first user to perform a task included in the request.

17. The method of claim 10, further comprising replacing the requested privilege level in the request with a minimum privilege level.

18. The method of claim 10, further comprising:
   receiving a request for login to the device, the request including the first user identifier and the device identifier;
   querying the permissions database for a current privilege level associated with the first user identifier and the device identifier; and
   granting the request for login according to the current privilege level associated with the first user identifier and the device identifier in the permissions database.

19. An apparatus comprising:
   a controller including circuitry configured to:
      receive a request to access a device connected to a network from a first user at a privilege access manager connected to the device, wherein the request includes a start time for accessing the device;
      determine an approval workflow for the request based on a risk level associated with the request;
      determine whether a second user controls authorization to access the device based on the approval workflow;
      request authorization from the second user in response to a determination that the second user controls the authorization;
      determine, in response receiving authorization from the second user, a privilege level of access to the device based on the request; and
      schedule, in response to receiving the authorization from the second user, a process to modify an entry in a permissions database that grants the first user with access to the device at the determined privilege level at the start time;
      wherein a graphical user interface (GUI) is generated for retrieving a list of devices connected to the network, displaying the list of devices, and receiving a selection of the device from the first user to generate the request.

20. A computer-readable storage medium including instructions executable by a computer to cause the computer to perform operations comprising:
   receiving a request for privileged access to a device connected to a network;
   determining a risk level associated with the request based on at least one of a duration of the privileged access, a device identifier, a first user identifier, and a requested privilege level included in the request;
   dynamically identifying a second user to control authorization of the device based on the determined risk level; and
   scheduling, in response to receiving authorization from the second user, a process to modify an entry in a permissions database to associate the first user identifier and the device identifier with the requested privilege level for the duration;
   wherein a terminal associated with the first user identifier accesses the device at the requested privilege level within the scheduled duration.

* * * * *